3,150,110
HIGH GLOSS LATEX PAINTS
John Cornelius Becker, Jr., Madison, and John Henry Bress, Florham Park, N.J., assignors to Celanese Corporation of America, New York, N.Y., a corporation of Delaware
No Drawing. Filed Feb. 14, 1958, Ser. No. 715,196
9 Claims. (Cl. 260—17)

This invention relates to aqueous latex paints and more particularly to synthetic aqueous latex paints capable of producing high gloss finishes.

Synthetic latex paints and particularly paints containing latex polymers of vinyl compounds, such as vinyl acetate, have achieved commercial acceptance and have displaced oil and alkyd paints for many uses. However, the use of synthetic latex paints has been limited to application wherein a low gloss or medium gloss finish has been desired.

In accordance with this invention a pigmented aqueous latex paint is produced which, when applied to a smooth surface and dried has a gloss in excess of 70 units and preferably between about 78 and about 90 units at 60° viewing angle when measured on a gloss meter in accordance with Federal Specification TT–P–141b, Method 610.1.

The synthetic latex paints to which this invention relates are those which contain polymer particles of polyvinyl and polyvinylidene resins and particularly polymer particles of vinyl acetate polymers.

The latex resin or polymer particles may be prepared, in whole or in major part, from vinyl or vinylidene monomers, preferably from vinyl esters such as vinyl acetate, vinyl propionate, vinyl butyrate and vinyl stearate; or from acrylic esters such as methyl acrylate, ethyl acrylate, butyl acrylate, methyl methacrylate and ethyl methacrylate. Other vinyl and vinylidene monomers such as styrene, vinyl chloride, and vinylidene chloride may also be used. The above enumerated monomers may be copolymerized with each other or with minor amounts of other ethylenically unsaturated monomers such as butadiene, dibutyl fumarate and dibutyl maleate. Among the preferred copolymer systems which may be used are vinyl acetate-dibutyl fumarate, vinyl acetate-dibutyl maleate, vinyl acetate-vinyl propionate, vinyl acetate-vinyl stearate, vinyl acetate-ethyl acrylate, vinyl acetate-ethyl acrylate-methyl acrylate, vinyl acetate-butyl acrylate, ethyl acrylate-butyl acrylate-methyl methacrylate, styrene-butadiene. It is to be understood that the term "polymer of vinyl acetate" for example, is intended to cover polymeric systems in which the vinyl acetate is either the major or the sole constituent. If desired, particles of different compositions may be used in the same latex system, as for example, particles of vinyl acetate homopolymer and particles of vinyl acetate-dibutyl fumarate copolymer. A composite of this type would normally be used to obtain improved flexibility without plasticizer addition. Plasticizers are used where the resinous particles would otherwise be too hard to effectively coalesce into a film and/or where the resulting film would otherwise be poor in flexibility. The resin particles comprise between about 25 and about 40 weight percent of the total latex paint.

The particle size of the resin particles is extremely important in the attainment of a high gloss coating. For the purpose of this invention the latex should contain substantially no resin particles having a diameter in excess of 0.5 micron and preferably substantially no resin particles having a diameter in excess of 0.4 micron.

Vinyl acetate latices of suitable particle size may be prepared by polymerizing the vinyl acetate, with a comonomer if desired, in an aqueous medium containing a water soluble colloidal emulsifying agent and a water-immiscible non-ionic surface-active agent containing a polyalkylene oxide chain, all components being compatible with the resulting vinyl acetate polymer. If desired, an anionic surface active agent, such as an organic sulfonate, may also be included.

The water-soluble colloidal emulsifying agent may be any of those conventionally employed in the art, e.g., polyvinyl alcohol. However, especially good results have been obtained by the use of hydroxyethyl cellulose.

Examples of water-immiscible nonionic surface active agents containing polyalkylene oxide chains and suitable for use in the practice of this invention are the water-immiscible polypropylene glycols, produced by polymerization of propylene oxide; the water-immiscible reaction products of such polypropylene glycols and ethylene oxide which may be termed polypropylene-polyethylene glycols; and alkyl phenol polyethylene glycol ethers made by reaction of alkyl phenols, e.g. octyl, nonyl or decyl phenols, and ethylene oxide. Preferably, the mixture being polymerized contains at least one water-immiscible surface-active agent comprising a polymer of propylene oxide, e.g., the homopolymeric polypropylene glycol or the copolymeric polypropylene-polyethylene glycols referred to above, which may be the sole water-immiscible nonionic surface active agent present but which is desirably admixed with a water-immiscible alkyl phenol polyethylene glycol ether. Specific examples of commercially available materials of this type are the polypropylene glycols of molecular weight of about 1500 to 1800; the reaction products of this polypropylene glycol with ethylene oxide, and having ethylene oxide contents of 10 to 20% and 20 to 30%, respectively; and the nonyl phenyl polyethylene glycol ether containing about four ethylene oxide units per alkyl phenyl group in the molecule and having a solubility in water of less than 0.01% by weight. As used herein the term "water-immiscible" is used to designate materials having a cloud point for a 1% solution in water of less than 40° C., the cloud point being the temperature at which such solution shows turbidity on being warmed.

In accordance with a more preferred method of latex preparation, the vinyl acetate or other vinyl ester of a fatty acid is polymerized in an aqueous emulsion containing small amounts of a mixture of dispersing or emulsifying agents comprising (I) water-soluble hydroxyethyl cellulose, (II) an anionic surface-active agent comprising an organic sulfonate, (III) a water-miscible non-ionic surface-active agent containing polymerized ethylene oxide units, and (IV) the water-immiscible nonionic surface-active agent containing polyalkylene oxide chains, previously described. The resulting latices have excellent freeze-thaw stability. Preferably, the amount of water-immiscible nonionic surface-active agent is greater than the amount of water-miscible surface-active agents present in the emulsion, in order that the films produced from the resulting latices should be especially clear and should have outstanding resistance to water-spotting.

Particularly good results in latex preparation have been obtained when the mixture of dispersing or emulsifying agents comprises, a blend of (I) hydroxyethyl cellulose, (II) a sodium salt of an alkyl aryl sulfonic acid, (III) a product obtained by the reaction of a water-insoluble polymer of propylene oxide with sufficient ethylene oxide to produce a water-miscible material, and (IV) the previously described mixture of a water-immiscible polypropylene glycol or polypropylene-polyethylene glycol and a water-immiscible alkyl phenyl ethylene glycol ether. As the constituent II, the sodium dodecyl benzene sulfonate is particularly suitable. Examples of other organic sulfonates are sodium octyl sulfosuccinate, sodium dodecyl benzene sulfonate and sodium N-methyl-N-palmitoyl tauride. As the constituent III, it is preferred to use the product obtained by the reaction of a polypropylene glycol of molecular weight of about 1500 to 1800 with ethylene oxide, the ethylene oxide content of the product being 80 to 90%. Other water-miscible nonionic surface active agents which may be employed are the reaction products of one mole of nonyl phenol and about 20 to 30 moles of ethylene oxide, the reaction product of one mole of oleyl alcohol and about 20 moles of ethylene oxide, the reaction product of one mole of tallow alcohols and about 20 moles of ethylene oxide and trimethyl nonyl alcohol-ethylene oxide reaction product.

The amount of hydroxyethyl cellulose is advantageously at most about 1%, preferably about 0.1 to 1.0% of the total weight of the emulsion.

For best results in latex preparation, the proportions of anionic surface-active agent (II) should be about 0.05 to 0.5%, preferably 0.1 to 0.3%, of the total weight of the emulsion, while the proportion of water-miscible nonionic surface-active agent (III) should be about 0.1 to 1.0%, preferably 0.2 to 0.5% based on the total weight of the emulsion, and the proportion of water-immiscible nonionic surface-active agent (IV) should be about 0.5 to 3.0%, preferably 1.0 to 2.0%, based on the total weight of the emulsion and, as previously stated, should be larger than the proportion of water-soluble nonionic surface-active agent.

In the preparation of a suitable latex a free radical-producing initiator or catalyst, such as peroxide, is generally employed for bringing about the polymerization reaction. Alkali metal persulfates, such as potassium persulfate, have been found to be very effective peroxide initiators for this purpose. Other suitable initiators are well known in the art, e.g., hydrogen peroxide, and such combinations as mixtures of hydrogen peroxide and an iron salt; hydrogen peroxide and zinc formaldehyde sulfoxylate or other similar reducing agent; hydrogen peroxide and a titanous salt; potassium persulfate and sodium bisulfite; a bromate mixed with a bisulfite; and other redox catalyst systems. The proportion of catalyst may be varied, one suitable range being 0.05 to 0.3% based on the total weight of the emulsion.

It is desirable to carry out the polymerization reaction at an elevated temperature, e.g., about 60 to 95° C., preferably about 75 to 85° C. However, lower temperatures may be used with more active initiator systems. Polymerization may be carried out at atmospheric, superatmospheric or subatmospheric pressures.

It is often advantageous in latex preparation to incorporate an alkaline material, such as sodium bicarbonate, into the emulsion in order to control its pH during polymerization. Such alkaline material may be present in small amounts, e.g., 0.02 to 0.20%, based on the total weight of emulsion, so that the pH of the emulsion after polymerization is about 4 to 6.

It is desirable to have present in the preparation of the latex a chelating and sequestering agent, preferably one containing amine and carboxylic acid groups, such as for example, imino-triacetic acid or its alkali metal salts or ethylene diamine tetraacetic acid or its alkali metal salts. Especially good results have been obtained by the use of the trisodium salt of ethylene diamine tetraacetic acid. When the chelating and sequestering agent is included in the latex, white paint films produced from the latex have greatly improved resistance to yellowing during weathering. The sequestering agent may be added before, during or after the polymerization reaction. One suitable range of proportions for the sequestering agent is 0.01 to 0.1 part per 100 parts of latex.

In the preferred method of preparation of the latex paint, the pigment is mixed with a small amount of water containing pigment dispersant agents, wetting agents and/or surface-active agents to produce a uniform and heavy paste which is dispersed on conventional paint milling equipment and is then let-down with an aqueous polymer latex, such as that described above.

For a high gloss paint, the pigment should contain substantially no particles having a diameter in excess of 1 micron. The predominant pigment particle size should be less than 0.5 micron. The amount of pigment used should be no greater than about 30% of the "Critical Pigment Volume Concentration" (C.P.V.C.) of the latex. "Pigment Volume Concentration" (P.V.C.) is defined in the art as the ratio of the volume of wetted pigment to the total volume of wetted pigment plus non-volatile vehicle in the paint, while "Critical Pigment Volume Concentration" is defined as that pigment volume concentration above which a discontinuous film is obtained as evidenced by rapid decrease in tensile strength, scrubbability, gloss, water vapor permeability, weatherability and other factors dependent on the continuity of the film. The "Critical Pigment Volume Concentration" is the sharp break point obtained in plotting a performance property, of which tensile strength has been shown to be especially definitive, vs. pigment volume concentration.

The attainment of high gloss in a latex paint is also dependent on the compatibility of all ingredients in the film. The compatibility of any two non-volatile ingredients with each other at any particular ratio may be ascertained by depositing a separate film of each ingredient, and by depositing a film containing both ingredients. The gloss and clarity characteristics of the combined film are compared with those of separate films. If the gloss and clarity of the combined film are intermediate or superior to those of the separate films, the ingredients are compatible with each other. If the gloss and clarity of the combined film are inferior to those of either separate film, the ingredients are incompatible, at the ratio tested.

Latex polymers are thermoplastic in nature. Unless heat or solvents can be used to aid particle coalescence, the polymer particles must be made sufficiently soft to permit coalescence. As a result the film is inherently lacking in hardness and it is desirable to include in the latex paint a hard resinous anti-blocking agent which is soluble in the aqueous medium. The soluble hard resinous anti-blocking agent is one which upon evaporation of the aqueous medium produces a resin having a softening point significantly higher than that of the polyvinyl resin of which the latex particles are composed. Anti-blocking agent efficiency increases as softening point increases by at least 60° F. and preferably by at least 200 ° F. Rosin derivatives may be prepared by esterification or hydrogenation to produce suitable hard resinous anti-blocking agents. Pentaerythritol esters of rosin and hydrogenated rosin, glycerol esters of rosin and hydrogenated rosin, glycol esters of rosin, maleic or fumaric alkyd modified esters of rosin, phenolic modified and hydrogenated rosin, pentaerythritol esters of rosin are suitable. The aqueous solution of the ammonium salt of a synthetic resin complex has been found to be particularly suitable.

The anti-blocking agent increases the resistance to blocking or sticking between painted surfaces under elevated temperature or high pressure. While it is not desired to be bound by any particular theory of operation, it is believed that the anti-blocking agent forms a film around the coalescing particles of the vinyl resin as the paint film is being formed. As the aqueous medium evaporates, the anti-blocking agent hardens, reducing the effect of the the thermoplastic latex particles on film hardness.

In the preferred method of preparation of the paint, the pigment is blended in a mixer with water dispersing or emuslifying agents comprising (I) a water-soluble nonionic surface active agent, (II) a water dispersible pigment wetting agent and (II) a water soluble thickner. If desired, the thickner may be omitted from the paste and added during let down. In many cases the paste will also include (IV) a water soluble anionic pigment dispersant. A buffer material such as potassium carbonate is sometimes included in the paste to raise the pH of the paint.

The aforementioned ingredients are generally mixed to form a heavy paste for a minimum time of twenty minutes. At this point an antifoam agent may be added, if desired.

The paste is then reduced or let down with polyvinyl resin particles in latex or emulsion form. Where relatively hard polyvinyl resin particules are used, a coalescing solvent may also be added during the let down to improve fusion of the particles into a contiguous film. For example, where the resinous particles comprise the homopolymer of vinyl acetate, it may be desirable to add diethylene glycol monoethyl ether as a coalescing solvent. The coalescing solvent is preferably added prior to the addition of the resinous particle dispersion due to its coagulating tendencies. When used, the coalescing solvent will generally be included in amounts between about 3 and about 25 weight percent, based on the weight of the hard resinous particles. The optimum amount depends largely on the nature of the resinous particles and the efficiency of the coalescing solvent.

The polyvinyl latex or emulsion is generally adjusted to an alkaline pH when desired by the addition of a buffer such as potassium carbonate, or by the addition of an alkaline material, such as concentrated ammonium hydroxide. In general it is desired that the pH of the completed latex paint be between about 7.0 and about 10.0 and preferably between about 8.0 and about 9.5

The soluble hard resinous anti-blocking agent, when used, must be added to an alkaline medium and is preferably added in the pigment paste where it contributes to pigment dispersion by tackifying the mix.

The reduction or let down contains some or all of the thickener. Other ingredients, such as fungicides may also be included in the let down. Phenyl mercuric acetate is a suitable fungicide.

Among the suitable pigments which may be used in accordance with this invention are the finely divided rutile titanium dioxides.

Pigments other than rutile titanium dioxide may also be used. As may be seen from the foregoing description of the method of mixing the ingredients and from the nature of the ingredients mixed, and as is shown in the examples, the pigment particles are free of hydrophobic coatings. Among the suitable pigments which may be used are carbon black, anatase titanium dioxide, lamp black, finely divided kaolin clays, Hansa Yellow G, Toluidene Red, Chrome Yellow, Chrome Green, Pigment Green R.

Among the preferred water-soluble non-ionic surface active agents used in the preparation of the latex paint are those obtained by the reaction of a water-insoluble polymer of propylene oxide with sufficient ethylene oxide to produce a water-soluble material. Suitable materials are those discussed above (as constitutent (III)) in connection with the preparation of the resin latex. The water-soluble nonionic surface active agent, when used, is included in amounts between about 0.05 and about 0.5 weight percent, based on the total weight of the latex paint.

The water dispersible pigment wetting agent when used is preferably a water dispersible soybean lecithin. The pigment wetting agent is generally included in amounts between about 0.2 and about 1.0 weight percent, based on the total weight of the latex paint.

The thickener is preferably cellulosic, of which the following are satisfactory: methyl cellulose, hydroxyethyl cellulose and carboxy methyl cellulose. Other thickeners which may be used are polyvinyl alcohol, gum arabic, gum tragacanth, ammonium polyacrylate, sodium polyacrylate, ammonium alginate, sodium alginate. The thickener is generally included in amounts between about 0.2 and about 2.0 weight percent, based on the total weight of the latex paint.

The preferred anionic pigment dispersants are those composed of polymerized sodium salts of alkyl naphthalene sulfonic acid. Other anionic dispersants which may be used are a sodium salt of polymerized alkyl aryl sulfonic acid; a guanidine salt of monoethyl phenol; and a sodium salt of a condensed sulfonic acid. When used, the anionic dispersant is included in amounts between about 0.1 and about 1.0 weight percent based on the total weight of the latex paint.

EXAMPLE I

All "parts" as used herien and in subsequent examples are parts by weight.

The polyvinyl acetate homopolymer latex suitable for use with this invention was prepared by polymerization in an aqueous medium. The following ingredients were used:

| | Parts by weight |
|---|---|
| Vinyl acetate monomer | 53.00 |
| Hydroxyethyl cellulose | 0.606 |
| Nonyl phenyl polyethylene glycol ester | 0.20 |
| Reaction product of polypropylene glycol with ethylene oxide containing 10–20% ethylene oxide | 1.60 |
| The reaction product of polypropylene glycol with ethylene oxide having an ethylene oxide content of 80–90% | 0.40 |
| Sodium dodecyl benzene sulfate paste (63% contration) | 0.30 |
| Potassium persulfate | 0.16 |
| Sodium bicarbonate | 0.012 |
| Water | 43.722 |
| | 100.00 |

Polymerization proceeded over a 5 hour period at a temperature of 60° C. to approximately 80° C. with a finish-off temperature of approximately 90° C. to produce an unreacted vinyl acetate monomer content of less than 0.5%. Small amounts of water were used at the end to adjust viscosity to about 1200 centipoises while maintaining solids content at about 55%.

EXAMPLE II

The polyvinyl acetate copolymer latex suitable for use with this invention was a fine particle size, copolymer of vinyl acetate and dibutyl fumarate in a 4:1 ratio. The following ingredients were used:

| | Parts by weight |
|---|---|
| Vinyl acetate monomer | 42.40 |
| Dibutyl fumarate monomer | 10.60 |
| Hydroxyethyl cellulose | 0.606 |
| Nonyl phenyl polyethylene glycol ester | 0.20 |
| Reaction product of polypropylene glycol with ethylene oxide containing 10–20% ethylene oxide | 1.80 |
| The reaction product of polypropylene glycol with ethylene oxide having an ethylene oxide content of 80–90% | 0.40 |
| Sodium dodecyl benzene sulfate paste (63% concentration) | 0.30 |
| Potassium persulfate | 0.16 |
| Sodium bicarbonate | 0.012 |
| Water | 43.522 |
| | 100.00 |

Polymerization proceeded over a 5 hour period at temperatures of 60° C. to approximately 80° C. with a finish-off temperature of approximately 90° C. to produce an unreacted vinyl acetate monomer content of less than 0.5%. Small amounts of water were used at the end to adjust viscosity to about 2200 centipoises while maintaining solids content at about 55%.

EXAMPLE III

| | Parts by weight |
|---|---|
| 20% Sodium salts of alkyl naphthalene sulfonic acids | 8 |
| Nonyl phenyl polyethylene glycol ester | 3 |
| Soybean lecithin | 2 |
| Potassium carbonate | 1 |
| Rutile titanium dioxide | 100 |
| Chromium oxide green dispersion | 40 |
| 2% 4000 cps. methyl cellulose solution | 25 |
| Water (added incrementally during pigment addition to maintain heavy paste) | 24 |
| | 203 | were added in the order listed and mixed as a heavy paste for about 20 minutes, then added:

| | |
|---|---|
| Antifoam agent | 2 |
| | 205 |

Dispersed on a three-roll mill and letdown with:

| | |
|---|---|
| Diethylene glycol monoethyl ether | 40 |
| Polyvinyl acetate dispersion of Example I (adjusted pH to 7.0 with 25% potassium carbonate solution) | 500 |
| Polyvinyl acetate copolymer dispersion of Example II (adjusted pH to 7.0 with 25% potassium carbonate solution) | 330 |
| | 1075 |

| | |
|---|---|
| Weight per gallon _____lbs__ | 10.0 |
| PVC _____percent__ | 6.9 |
| Solids content _____do____ | 55.0 |
| Viscosity _____Krebs units__ | 65 |
| pH | 7.0 |

This formulation gave a 60° gloss of 82.

EXAMPLE IV

*Polyvinyl Acetate White Interior Gloss Paint*

| | Pounds |
|---|---|
| 20% sodium salts of alkyl naphthalene sulfonic acids solution | 8 |
| Nonyl phenyl polyethylene glycol ester | 3 |
| Soybean lecithin | 2 |
| Potassium carbonate | 1 |
| Rutile titanium dioxide | 113 |
| 2% 4000 cps. methyl cellulose solution | 25 |
| Water (added incrementally during pigment addition to heavy paste) | 24 |
| | 176 | were added in the order listed and mixed as a heavy paste for about 20 minutes, then added:

| | |
|---|---|
| Antifoam agent | 2 |
| | 178 | dispersed on a three-roll mill and letdown with:

| | |
|---|---|
| Diethylene glycol monoethyl ether | 40 |
| Example I dispersion (adjusted pH to 7.0 with 25% potassium carbonate solution) | 500 |
| Example II dispersion (adjusted pH to 7.0 with 25% potassium carbonate solution) | 330 |
| | 1048 |

| | |
|---|---|
| Weight per gallon _____lbs___ | 9.9 |
| PVC _____percent__ | 6.4 |
| Solids content _____do____ | 55.2 |
| Viscosity _____Krebs units__ | 65 |
| pH | 7.0 |

This formulation gave a 60° gloss of 85.

EXAMPLE V

*Polyvinyl Acetate Green Gloss Paint*

| | Parts by weight |
|---|---|
| Nonyl phenyl polyethylene glycol ester | 5.0 |
| Potassium carbonate | 2.0 |
| Soybean lecithin | 3.0 |
| Chrome green medium | 41.5 |
| Chrome yellow medium | 50.5 |
| Water (added incrementally during pigment addition to maintain heavy paste) | 50.5 |
| | 152.5 | added in the order listed and mixed as a heavy paste for about 20 minutes, then added:

| | |
|---|---|
| Antifoam agent | 2.0 |
| | 154.5 | dispersed on a three roll mill and letdown with:

| | |
|---|---|
| PMA-15 | 0.3 |
| 2% 4000 cps. methyl cellulose solution | 150.0 |
| Soybean lecithin | 5.0 |
| Diethylene glycol monoethyl ether | 40.0 |
| Water | 184.7 |
| Example II dispersion | 127.5 |
| Example I dispersion | 297.5 |
| Water | 50.0 |
| 2% 4000 cps. methyl cellulose solution (HG Grade) | 50.0 |
| | 1059.5 |

| | |
|---|---|
| Weight per gallon | 9.6 lbs. |
| PVC | 8.0%. |
| Solids content | 32.6% |
| Viscosity | 65 Krebs units, 61 Krebs units after 6 weeks. |
| pH | 5:4; 5.5 after 6 weeks. |

This formulation showed a Hegman Fineness of 7½, good color development, and gave a 60° gloss of 82.

EXAMPLE VI

*Polyvinyl Acetate Interior White Gloss Paint*

| | Parts by weight |
|---|---|
| 20% sodium salt of alkyl naphthalene sulfonic acid solution | 8 |
| Alkyl phenyl polyethylene glycol ether (alkyl phenyl polyethylene glycol ether) | 3 |
| Soybean lecithin | 2 |
| Potassium carbonate | 1 |
| Rutile titanium dioxide | 125 |
| Ammonium salt of rosin ester complexes (added incrementally during pigment addition to maintain heavy paste) | 100 |
| | 239 | added in the order listed and mixed as a heavy paste for about 20 minutes, then added:

| | |
|---|---|
| Antifoam agent | 3 |
| | 242 | dispersed on a three-roll mill and letdown in the following order with:

| | |
|---|---|
| Diethylene glycol monoethyl ether (added slowly) | 40 |
| | 282 | thoroughly stirred into paste for ten minutes.

Example I dispersion (adjusted pH to 8.7 with conc. ammonium hydroxide) _____ 400
Example II dispersion (adjusted pH to 8.7 with conc. ammonium hydroxide) _____ 260
Water _____ 30
2% 4000 cps. methyl cellulose solution (HG Grade) _____ 29

_____
1001

Weight per gallon _____ 10.0 lbs.
PVC _____ 8.3 percent
Solids content _____ 52.0 percent
Viscosity _____ 65 Krebs units (over night)
pH _____ 8.4

This formulation was compared in properties with a commercial oil-based gloss paint as follows:

TABLE

[Comparison of properties of emulsion and oil based glossed paints]

| | Polyvinyl acetate based gloss paint | Commercial oil paint |
| --- | --- | --- |
| Viscosity (Krebs units) | 63 | 73. |
| Brushability | Fair | Poor. |
| Flow | do | Excellent. |
| Color uniformity (tinted) | Excellent | Very good. |
| Sheen uniformity (tinted) | Very good | Excellent. |
| Colorability | Excellent | Do. |
| Water | Very good | Do. |
| Wet crocking | None | None. |
| Dry crocking | do | Do. |
| 60° gloss | 82 | 93. |
| Scrub resistance (cycles with abrasive powder and abrasion boat) | >14,000 | >14,000. |
| Stain removal: | | |
| Ink | Excellent | Very good. |
| Pencil | do | Excellent. |
| Whiteness or reflectance (percent) | 90 | 84. |
| Contrast ratio | 0.944 | 0.988. |
| Pressure blocking | Excellent | Excellent. |
| Temperature blocking | Good | Do. |

EXAMPLE VII

*Polyvinyl Acetate Black Gloss Paint*

Parts by weight
20% Sodium salt of alkyl naphthalene sulfonic acid solution _____ 1.5
Alkyl phenyl polyethylene glycol ether _____ .5
Soybean lecithin _____ .5
Potassium carbonate _____ .2
Carbon black _____ 6.0
Ammonium salt of rosin ester complexes _____ 20.0
Diethylene glycol monoethyl ether _____ 8.0
Water (added incrementally during pigment addition to maintain heavy paste) _____ 20.0

_____
56.7 added in the order listed and mixed as a heavy paste for about 20 minutes, then added:
Antifoam agent _____ .5

_____
57.2 dispersed on a three-roll mill and letdown in the following order with:
Ammonium salt of rosin ester complexes _____ 86.0
Example I dispersion (adjusted pH to 8.7 with conc. ammonium hydroxide) _____ 520.0
Example II dispersion (adjusted pH to 8.7 with conc. ammonium hydroxide) _____ 336.0

_____
998.7

Weight per gallon _____pounds__ 9.1
PVC _____percent__ 0.8
Solids content _____do____ 50.0
Viscosity _____Krebs units__ 57
pH _____ 8.2
This formulation gave a 60° gloss of 80.

EXAMPLE VIII

*Polyvinyl Acetate Interior White Gloss Paint*

Parts by weight
20% Sodium salt of alkyl naphthalene sulfonic acid solution _____ 12
Alkyl phenyl polyethylene glycol ether _____ 4.5
Soybean lecithin _____ 3
Potassium carbonate _____ 1.5
Rutile titanium dioxide _____ 193
Ammonium salt of rosin ester complexes (added incrementally during pigment addition to maintain heavy paste) _____ 86

_____
300.0 added in order listed and mixed as a heavy paste for about 20 minutes, then added:
Antifoam agent _____ 4.5

_____
304.5 dispersed on a three-roll mill and letdown in the following order with:

Example II dispersion (adjusted pH to 8.7 with concentrated ammonium hydroxide, under agitation) _____ 557
2% hydroxyethyl cellulose solution _____ 77
Water (for viscosity adjustment) _____ 100

_____
1038.5

Weight per gallon _____ 10.3 pounds
PVC _____ 13.8 percent
Solids content _____ 52.0 percent
Viscosity _____ 65 Krebs units (overnight)
pH _____ 8.4
This formulation had 60° gloss of 68.

EXAMPLE IX

*Polyvinyl Acetate Interior White Gloss Paint*

Parts by weight
20% Sodium salt of alkyl naphthalene sulfonic acid solution _____ 12.0
Alkyl phenyl polyethylene glycol ether _____ 4.5
Soybean lecithin _____ 3.0
Potassium carbonate _____ 1.5
Rutile titanium dioxide _____ 150.0
Clay _____ 26.0
Ammonium salt of rosin ester complexes (added incrementally during pigment addition to maintain heavy paste) _____ 86.0

_____
283.0 added in order listed and mixed as a heavy paste for a minimum of 20 minutes, then added:
Antifoam agent _____ 4.5

_____
287.5 dispersed on a three-roll mill and letdown in the following order with:

Example II dispersion (adjusted pH to 8.7 with concentrated ammonium hydroxide, under agitation) _____ 557.0
2% 4000 cps. methyl cellulose solution _____ 77.0
Water (for viscosity adjustment) _____ 100.0

_____
1021.5

| | |
|---|---|
| Weight per gallon | 10.2 pounds |
| PVC | 13.8 percent |
| Solids content | 50.4 percent |
| Viscosity | 65 Krebs units (overnight) |
| pH | 8.2–8.7 |

This formulation had a 60° gloss of 69.

It is to be understood that the foregoing detailed description is given merely by way of illustration and that many variations may be made therein without departing from the spirit of our invention.

Having described our invention, what we desire to secure by Letters Patent is:

1. A pigmented aqueous latex paint comprising at least 10 weight percent of pigment free of hydrophobic coatings and a polymer of vinyl acetate, said paint having substantially no polymer particles greater in diameter than 0.5 micron and substantially no pigment particles greater in diameter than 1 micron and having a gloss in excess of 70 units at a 60° viewing angle when measured on a gloss meter in accordance with Federal Specification TT–P–141b, Method 610.1, after being applied to a smooth surface and dried.

2. A paint as claimed in claim 1 wherein said pigment is carbon black.

3. A pigmented aqueous latex paint comprising at least 10 weight percent of pigment free of hydrophobic coatings and a polymer of vinyl acetate, said paint having substantially no polymer particles greater in diameter than 0.5 micron and substantially no pigment particles greater in diameter than 1 micron, said paint having a pigment volume concentration not higher than about 30% of the Critical Pigment Volume Concentration and having a gloss in excess of 70 units at a 60° viewing angle when measured on a gloss meter in accordance with Federal Specification TT–P–141b, Method 610.1, after being applied to a smooth surface and dried.

4. A pigmented aqueous latex paint comprising at least 10 weight percent of pigment free of hydrophobic coatings and a polymer of vinyl acetate, said paint having substantially no polymer particles greater in diameter than 0.5 micron and substantially no pigment particles greater in diameter than 1 micron said paint containing only ingredients which are compatible with each other and having a pigment volume concentration not higher than about 30% of the Critical Pigment Volume Concentration and having a gloss in excess of 70 units at a 60° viewing angle when measured on a gloss meter in accordance with Federal Specification TT–P–141b, Method 610.1, after being applied to a smooth surface and dried.

5. A pigmented aqueous latex paint comprising at least 10 weight percent of pigment free of hydrophobic coatings and a polymer of vinyl acetate, said paint having substantially no polymer particles greater in diameter than 0.5 micron and substantially no pigment particles greater in diameter than 1 micron said paint containing a hard resinous anti-blocking agent which is soluble in the latex medium and containing only ingredients which are compatible with each other and having a pigment volume concentration not higher than about 30% of the Critical Pigment Volume Concentration and having a gloss in excess of 70 units at a 60° viewing angle when measured on a gloss meter in accordance with Federal Specification TT–P–141b, Method 610.1, after being applied to a smooth surface and dried.

6. A pigmented aqueous latex paint comprising at least 10 weight percent of pigment free of hydrophobic coatings and a polymer of vinyl acetate, said paint having substantially no polymer particles greater in diameter than 0.5 micron and substantially no pigment particles greater in diameter than 1 micron, said paint containing a non-ionic emulsifier, a pigment wetting agent and a thickener and having a gloss in excess of 70 units at a 60° viewing angle when measured on a gloss meter in accordance with Federal Specification TT–P–141b, Method 610.1, after being applied to a smooth surface and dried.

7. A pigmented aqueous latex paint comprising at least 10 weight percent of pigment free of hydrophobic coatings and a polymer of vinyl acetate, said paint having substantially no polymer particles greater in diameter than 0.5 micron and substantially no pigment particles greater in diameter than 1 micron, said paint containing a water soluble non-ionic emulsifier, a water dispersible pigment wetting agent, a water soluble anionic pigment dispersant and a thickener and having a gloss in excess of 70 units at a 60° viewing angle when measured on a gloss meter in accordance with Federal Specification TT–P–141b, Method 610.1, after being applied to a smooth surface and dried.

8. A pigmented aqueous latex paint comprising a polymerized sodium salt of an alkyl naphthalene sulfonic acid pigment dispersant, a water-soluble, non-ionic surface active agent, a water dispersible soybean lecithin, a cellulosic thickener, a finely divided rutile titanium dioxide pigment free of hydrophobic coatings and having substantially no particles with a diameter in excess of 1 micron, and a predominant particle size of 0.25 micron, diethylene glycol monoethyl ether, a hard, resinous anti-blocking agent which is soluble in the latex medium, a latex dispersion of polyvinyl acetate homopolymer and a latex dispersion of the copolymer of vinyl acetate and dibutyl fumarate, both of said dispersions having substantially no particles having a diameter in excess of 0.5 micron.

9. A pigmented aqueous latex paint comprising a polymerized sodium salt of an alkyl naphthalene sulfonic acid pigment dispersant, a water-soluble non-ionic surface active agent, a water dispersible soybean lecithin, a cellulosic thickener, a finely divided rutile titanium dioxide pigment free of hydrophobic coatings and having substantially no particles with a diameter in excess of 1 micron, and a predominant particle size of 0.25 micron, diethylene glycol monoethyl ether, a hard resinous anti-blocking agent which is soluble in the latex medium, a latex dispersion of a polyvinyl acetate homopolymer and a latex dispersion of the copolymer of vinyl acetate and dibutyl fumarate, both of said dispersions having substantially no particles having a diameter in excess of 0.5 micron.

References Cited in the file of this patent

UNITED STATES PATENTS

| | | |
|---|---|---|
| 2,536,470 | Schoenholz et al. | Jan. 2, 1951 |
| 2,567,678 | Morrison | Sept. 11, 1951 |
| 2,613,160 | Walton et al. | Oct. 7, 1952 |
| 2,615,006 | Lane | Oct. 21, 1952 |
| 2,719,133 | Smith | Sept. 27, 1955 |
| 2,731,433 | Johnson | Jan. 17, 1956 |
| 2,763,578 | Simons | Sept. 18, 1956 |
| 2,778,740 | Sterling | Jan. 22, 1957 |
| 2,828,222 | Kine et al. | Mar. 25, 1958 |
| 2,828,223 | McWherter et al. | Mar. 25, 1958 |
| 2,889,299 | Ritson | June 2, 1959 |
| 2,914,495 | Gordon et al. | Nov. 24, 1959 |
| 2,944,040 | Pollock et al. | July 5, 1960 |
| 3,054,762 | Rees | Sept. 18, 1962 |

OTHER REFERENCES

Gardner et al.: "Physical and Chemical Examination of Paints, Varnishes, Lacquers and Colors," distributed by Henry A. Gardner Laboratory Inc., Bethesda, Md., 11th edition, January 1950, pages 103 to 112.